United States Patent
Shimizu et al.

(10) Patent No.: US 12,542,036 B2
(45) Date of Patent: Feb. 3, 2026

(54) TERMINAL APPARATUS HAVING AN INTERLOCKING PORTION FOR INTERLOCKING TWO SUPPORT PORTIONS FOR ROTATABLY SUPPORTING AN INPUT DEVICE AND A DISPLAY

(71) Applicant: NEC Corporation, Tokyo (JP)

(72) Inventors: Takashi Shimizu, Tokyo (JP); Hiroshi Morimitsu, Tokyo (JP); Takahiro Ambe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/832,156

(22) PCT Filed: Feb. 1, 2022

(86) PCT No.: PCT/JP2022/003820
§ 371 (c)(1),
(2) Date: Jul. 23, 2024

(87) PCT Pub. No.: WO2023/148817
PCT Pub. Date: Aug. 10, 2023

(65) Prior Publication Data
US 2025/0148883 A1    May 8, 2025

(51) Int. Cl.
*G07G 1/00* (2006.01)
*G07G 1/01* (2006.01)

(52) U.S. Cl.
CPC ............. *G07G 1/0018* (2013.01); *G07G 1/01* (2013.01)

(58) Field of Classification Search
CPC ............... G07G 1/0018; G07G 1/01

USPC ........................................................ 235/383
See application file for complete search history.

(56) References Cited

FOREIGN PATENT DOCUMENTS

| | | |
|---|---|---|
| JP | S63-205716 A | 8/1988 |
| JP | H04-278984 A | 10/1992 |
| JP | 2000-149140 A | 5/2000 |
| JP | 2001-290560 A | 10/2001 |
| JP | 2009-094723 A | 4/2009 |

OTHER PUBLICATIONS

Machine translation of JPS63205716 retrieved from European Patent Office on Mar. 21, 2025 (Year: 2025).*
International Search Report for PCT Application No. PCT/JP2022/003820, mailed on Apr. 19, 2022.

* cited by examiner

*Primary Examiner* — Suezu Ellis
(74) *Attorney, Agent, or Firm* — Sughrue Mion, PLLC

(57) ABSTRACT

A terminal apparatus (10) is used when target processing being at least one of product registration processing and settlement processing is performed, and includes a first support portion (300), a first display (130), a second support portion (200), and an interlocking portion (400). The first support portion (300) rotatably supports, in a horizontal direction, an input device (120) operated by a user of the terminal apparatus (10). The first display (130) faces a user of the terminal apparatus (10). The second support portion (200) rotatably supports the first display (130) in the horizontal direction. The interlocking portion (400) interlocks the first support portion (300) and the second support portion (200) with each other, and rotates the input device (120) and the first display (130) in the same direction.

7 Claims, 4 Drawing Sheets

TERMINAL APPARATUS HAVING AN INTERLOCKING PORTION FOR INTERLOCKING TWO SUPPORT PORTIONS FOR ROTATABLY SUPPORTING AN INPUT DEVICE AND A DISPLAY

This application is a National Stage Entry of PCT/JP2022/003820 filed on Feb. 1, 2022, the contents of all of which are incorporated herein by reference, in their entirety.

TECHNICAL FIELD

The present invention relates to a terminal apparatus.

BACKGROUND ART

At a retail store and the like, as represented by a POS terminal, a terminal apparatus that performs at least one of product registration processing and settlement processing is used.

Meanwhile, a general-purpose personal computer is becoming widespread in recent years. Such a personal computer is normally used together with a display and a keyboard. Patent Document 1 describes a display automatic rotating apparatus that controls an orientation of a display according to an orientation of a keyboard. Further, Patent Document 2 describes that an installation pedestal on which a keyboard is installed is rotatably coupled to an installation pedestal on which a display is installed.

Note that, Patent Document 3 describes that an image in a position facing a screen is captured in a television including a rotating pedestal, and the rotating pedestal is rotated by using the image in such a way that the screen is in a position facing a viewer.

RELATED DOCUMENT

Patent Document

Patent Document 1: Japanese Patent Application Publication No. H04-278984
Patent Document 2: Japanese Patent Application Publication No. 2001-290560
Patent Document 3: Japanese Patent Application Publication No. 2009-94723

DISCLOSURE OF THE INVENTION

Technical Problem

In a terminal apparatus that performs at least one of product registration processing and settlement processing, a preferable orientation of a display and an input device varies by a user who uses the terminal apparatus. Further, a preferable orientation of the display and a preferable orientation of the input device often are interlocked with each other. One example of an object of the present invention is to reduce effort required of a user when the user adjusts an orientation of the display and the input device in the terminal apparatus described above.

Solution to Problem

One aspect of the present invention provides a terminal apparatus that is used when target processing being at least one of product registration processing and settlement processing is performed, and includes:

a first support portion that rotatably supports, in a horizontal direction, an input device operated by a user;
a first display facing the user;
a second support portion that rotatably supports the first display in the horizontal direction; and
an interlocking unit that interlocks the first support portion and the second support portion with each other, and rotates the input device and the first display in a same direction.

Advantageous Effects of Invention

One aspect of the present invention can reduce effort required of a user when the user adjusts an orientation of a display and an input device in a terminal apparatus that performs at least one of product registration processing and settlement processing.

BRIEF DESCRIPTION OF THE DRAWINGS

The above-described object, the other objects, features, and advantages will become more apparent from suitable example embodiments described below and the following accompanying drawings.

EXAMPLE EMBODIMENT

Hereinafter, example embodiments of the present invention will be described with reference to the drawings. Note that, in all of the drawings, a similar component has a similar reference sign, and description thereof will be appropriately omitted.

Figure 1:
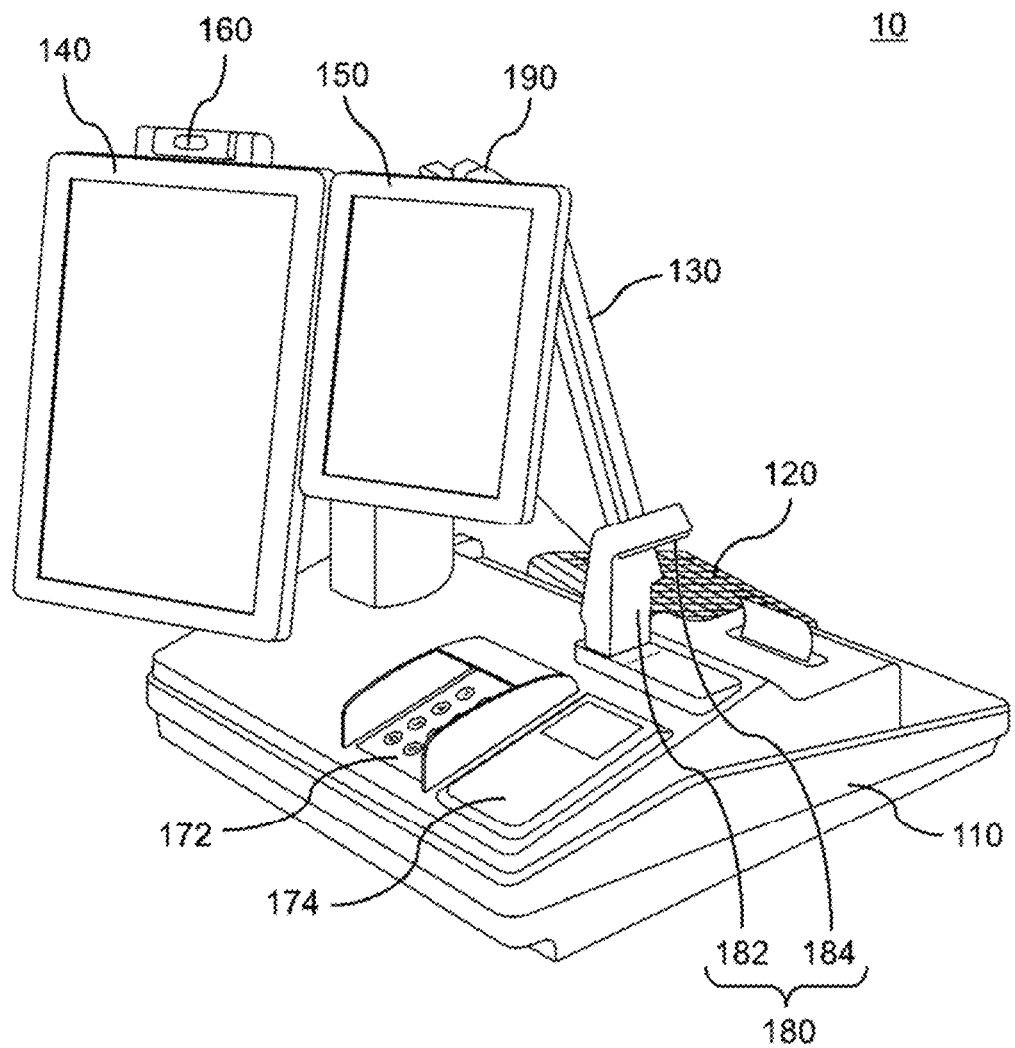
FIG. 1 is a perspective view of a terminal apparatus according to an example embodiment.
Figure 2:
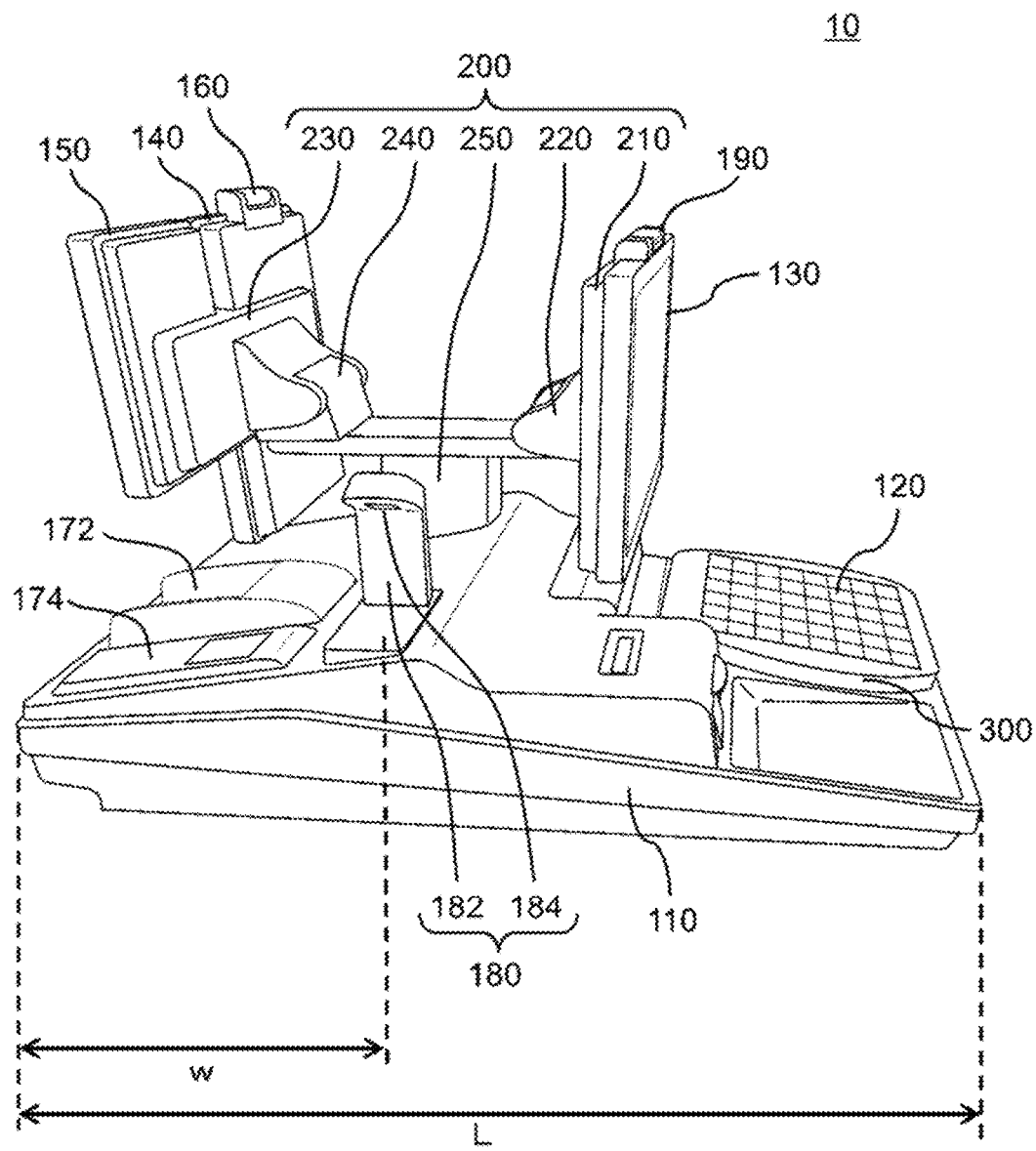
FIG. 2 is a side view of the terminal apparatus.
Figure 3:
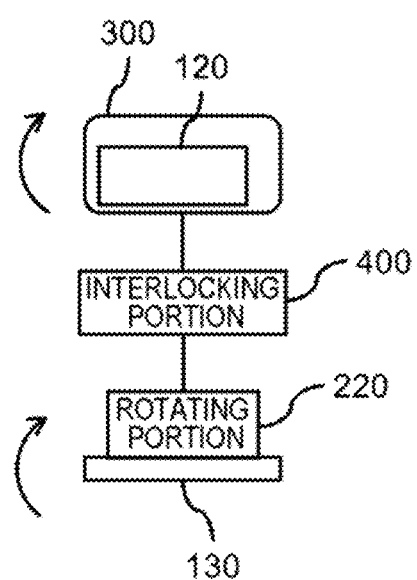
FIG. 3 is diagram illustrating a main unit of the terminal apparatus.

FIG. 1 is a perspective view of a terminal apparatus 10 according to an example embodiment, and FIG. 2 is a side view of the terminal apparatus 10. FIG. 3 is diagram illustrating a main unit of the terminal apparatus 10. The terminal apparatus 10 is used at a store, for example, and performs at least one of product registration processing and settlement processing. When the pieces of processing are performed, the terminal apparatus 10 is located between a salesclerk and a customer. One example of the terminal apparatus 10 is a POS terminal. The terminal apparatus 10 is disposed on a cash register counter, for example.

The terminal apparatus 10 includes a first support portion 300, a first display 130, and a second support portion 200. The first support portion 300 rotatably supports, in a horizontal direction, an input device 120 operated by a user of the terminal apparatus 10. In the examples illustrated in the diagrams, the first support portion 300 is integral with the input device 120, but the first support portion 300 and the input device 120 may be physically separated. The input device 120 is, for example, a keyboard. The first display 130 faces a user side who operates the input device 120. The second support portion 200 rotatably supports the first display 130 in the horizontal direction. As illustrated in FIG. 3, the terminal apparatus 10 further includes an interlocking portion 400. The interlocking portion 400 interlocks the first support portion 300 and the second support portion 200 with each other, and rotates the input device 120 and the first display 130 in the same direction. Hereinafter, the terminal apparatus 10 will be described in detail.

The terminal apparatus 10 includes a housing 110. An arithmetic processing unit is housed in the housing 110. The arithmetic processing unit performs at least one of, for example, both of the product registration processing and the settlement processing. The arithmetic processing unit may perform a part or the whole of the product registration processing, and may perform a part or the whole of the settlement processing. Further, the arithmetic processing unit may control the first display 130, and a second display 140 and a third display 150 described below:

Customer input devices 172 and 174 are disposed on one surface, for example, an upper surface of the housing 110. The customer input devices 172 and 174 are operated by a customer, and are thus located closer to a customer side than the center of the upper surface of the housing 110 in a plan view: One example of the customer input device 172 is a numeric keypad, and one example of the customer input device 174 is a reading apparatus that reads information from a medium. For example, the medium used herein may be a card including an IC chip, may be a portable terminal such as a smartphone, and may be paper on which a code is printed. The code used herein may be a bar code or a two-dimensional code. The customer input device 174 may read information from a medium by generating an image, may acquire information by performing short-range wireless communication with a medium, and may acquire information from a magnetic medium in a medium. Note that, the customer input device 174 may further have a function of writing information to a medium.

In the example illustrated in the diagrams, the input device 120 and the first display 130 face a salesclerk side, and the second display 140 and the third display 150 face the customer side.

The input device 120 is operated by a salesclerk. One example of the input device 120 is a keyboard as described above, but may be another input device.

The first display 130 displays an operation screen for a salesclerk, and also displays at least one of information about the product registration processing and information about the settlement processing. There are various operation screens displayed on the first display 130.

The third display 150 is smaller than the second display 140. For example, a width in a height direction of the third display 150 is equal to or more than 0.5 times and equal to or less than 0.8 times a width in a height direction of the second display 140. Further, the second display 140 and the third display 150 face in the same direction. For example, an angle formed by a normal line of the third display 150 and a normal line of the second display 140 is, for example, equal to or less than 30° and, furthermore, equal to or less than 15°.

One of the second display 140 and the third display 150 displays information about the settlement processing of a product, for example, a registered product name, a price, a total payment amount, a payment method, an amount of change, and the like. Further, another of the second display 140 and the third display 150 displays an advertisement. However, the pieces of information displayed on the second display 140 and the third display 150 may be reversed.

Further, as illustrated in FIG. 2, the first display 130, the second display 140, and the third display 150 are supported by the second support portion 200. Specifically, the second support portion 200 includes a strut portion 250, holding portions 210 and 230, and rotating portions 220 and 240.

The strut portion 250 has a columnar shape or a cylindrical shape, and is provided upright from the upper surface of the housing 110. The holding portion 210 is fixed to an upper portion of the strut portion 250 via the rotating portion 220, and the holding portion 230 is fixed to the upper portion of the strut portion 250 via the rotating portion 240.

The holding portion 210 is fixed to a back surface of the first display 130. The rotating portion 220 attaches the holding portion 210 to the upper portion of the strut portion 250 in a state where the holding portion 210 can rotate in both of an up-and-down direction and the horizontal direction. Thus, the first display 130 can rotate in both of the up-and-down direction and the horizontal direction with respect to the housing 110.

The holding portion 230 is fixed to a back surface of the second display 140 and a back surface of the third display 150. The rotating portion 240 attaches the holding portion 230 to the upper portion of the strut portion 250 in a state where the holding portion 230 can rotate in both of the up-and-down direction and the horizontal direction. Thus, the second display 140 and the third display 150 can rotate in both of the up-and-down direction and the horizontal direction with respect to the housing 110.

Note that, in the examples illustrated in the diagrams, the second display 140 and the third display 150 are integral by the holding portion 230. Thus, orientations of the second display 140 and the third display 150 change simultaneously. However, the second display 140 and the third display 150 may be able to rotate independently of each other in at least one of the up-and-down direction and a left-and-right direction.

Then, the interlocking portion 400 interlocks an orientation of the first support portion 300 and an orientation in the horizontal direction of the rotating portion 220 with each other. Specifically, the interlocking portion 400 rotates the rotating portion 220 in a right direction when the first support portion 300 rotates in the right direction, and the interlocking portion 400 rotates the rotating portion 220 in a left direction when the first support portion 300 rotates in the left direction. Further, the interlocking portion 400 rotates the first support portion 300 in the right direction when the first display 130 and the rotating portion 220 rotate in the right direction, and the interlocking portion 400 rotates the first support portion 300 in the left direction when the first display 130 and the rotating portion 220 rotate in the left direction. The interlock may be performed by using a mechanical mechanism, or may be performed by using electronic control. In the latter case, at least a part of an electronic function of the interlocking portion 400 may be achieved by the arithmetic processing unit in the housing 110. Further, the interlocking portion 400 may simultaneously change an orientation of the first support portion 300 and an orientation in the horizontal direction of the rotating portion 220 according to an input indicating a change in an orientation of the input device 120 and the first display 130. The input is performed by, for example, a user via the input device 120, or the first display 130 serving as a touch panel.

Further, when viewed from a salesclerk or a customer, the strut portion 250 of the second support portion 200, the center of the housing 110, and the customer input devices 172 and 174 are arranged in this order. In such a manner, a wiring line and the like for connecting the customer input devices 172 and 174 and the arithmetic processing unit in the housing 110 do not need to be provided in a region in the housing 110 located on the strut portion 250 side. Thus, a mechanism for interlocking the rotating portion 220 and the first support portion 300 with each other, and a control unit can be housed in the region.

Further, in the interlocking portion 400, an interlock between the first support portion 300 and the rotating portion 220 may be able to be released. As one example, the terminal apparatus 10 includes a switch for determining whether to interlock the first support portion 300 and the rotating portion 220 with each other. A user of the terminal apparatus 10, for example, a salesclerk determines whether to interlock the first support portion 300 and the rotating portion 220 with each other by operating the switch. Note that, the switch may be a mechanical switch or may be an electronic switch. In the latter case, the switch may be achieved by using, for example, the first display 130 serving as a touch panel.

When the interlock between the first support portion 300 and the rotating portion 220 by the interlocking portion 400 is electronically performed, a trigger for rotating the first support portion 300 and the rotating portion 220 may be rotation of the first support portion 300 or the rotating portion 220 by a user, or may be a detection result of a position of a user. In the latter case, the interlocking portion 400 controls an orientation of the first support portion 300 and the rotating portion 220 in such a way that the input device 120 and the first display 130 face the user.

Note that, a position of a user, for example, a position of a salesclerk is determined by image processing. For example, the image used herein may be generated by a surveillance camera installed in a store, or may be generated by a capturing unit 190 attached to the terminal apparatus 10. The capturing unit 190 is attached to, for example, the first display 130. Further, a position of a user may be determined by using a detection result of a human detection sensor. Note that, for example, the determination processing of a position of a user may be performed by the arithmetic processing unit in the housing 110, or may be performed by using an external apparatus of the terminal apparatus 10.

Further, when the interlock between the first support portion 300 and the rotating portion 220 by the interlocking portion 400 is electronically performed, the interlocking portion 400 may have a first mode and a second mode. In the first mode, the interlocking portion 400 controls an orientation of the first support portion 300 and the rotating portion 220 by using a detection result of a position of a user. In the second mode, when an orientation of one of the input device and the first display changes due to an external force, for example, when a user changes the orientation of one of the input device and the first display, the interlocking portion 400 changes an orientation of another of the input device and the first display.

Further, a capturing unit 160 is attached to the second display 140. An image generated by the capturing unit 160 includes a customer. Then, the image is used when, for example, an advertisement to be displayed on the third display 150 or the second display 140 is selected. Note that, the capturing unit 160 may be attached to the third display 150.

In the example illustrated in FIG. 1, both of the second display 140 and the third display 150 are vertically oriented. However, at least one of the second display 140 and the third display 150, for example, the third display 150 may be horizontally oriented.

The terminal apparatus 10 further includes a code reader 180. The code reader 180 reads a code of a product, for example, at least one of a bar code and a two-dimensional code. In the example illustrated in FIG. 1, the code reader 180 includes a strut 182 and a reading unit 184. The strut 182 is provided upright from the upper surface of the housing 110. The reading unit 184 extends obliquely upward from an upper portion of the strut 182, and includes a mechanism for reading a code on a lower surface side. Since the reading unit 184 extends obliquely upward, a readable region of a code by the code reader 180 spreads obliquely downward from the lower surface of the reading unit 184. Thus, as compared to when the reading unit 184 extends in a horizontal direction in the code reader 180, a larger product can be disposed in the readable region.

Further, as illustrated in FIG. 2, when a width of the housing 110 is L in a depth direction of the housing 110, i.e., a direction connecting the customer side and the salesclerk side, a distance w from an end portion of the housing 110 on the customer side to the center of the strut 182 is equal to or more than L/3 and equal to or less than 2 L/3 from the customer side. Then, the reading unit 184 extends from the strut 182 toward a surface of side surfaces of the housing 110 that does not face a customer and a salesclerk. Thus, both of a salesclerk and a customer can use the code reader 180.

Figure 4:
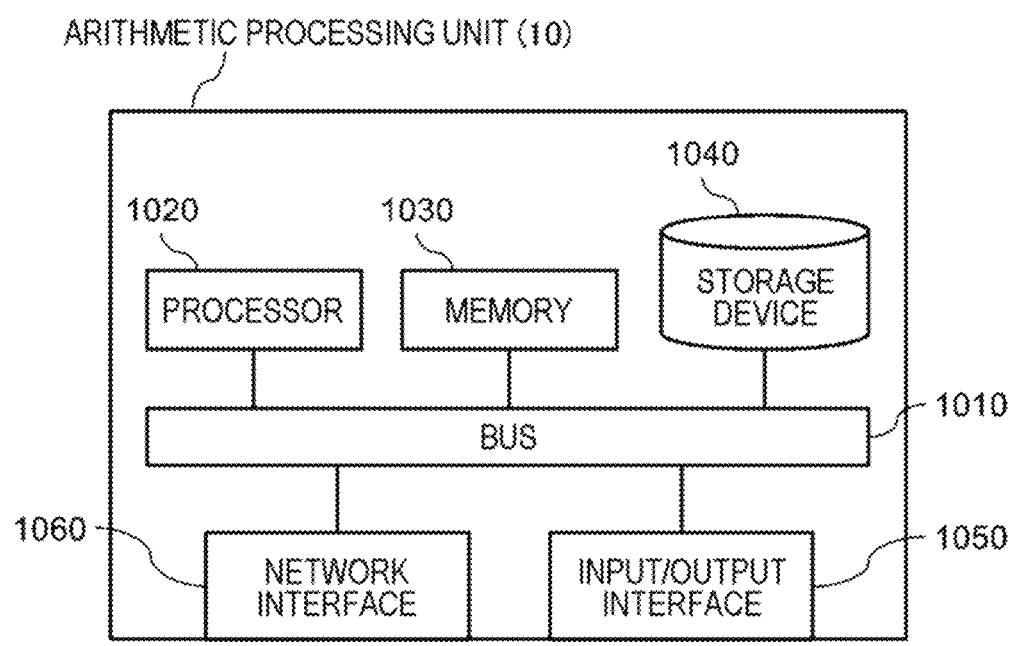
FIG. 4 is a diagram illustrating one example of a hardware configuration of an arithmetic processing unit in a housing.

FIG. 4 is a diagram illustrating one example of a hardware configuration of the arithmetic processing unit in the housing 110. The arithmetic processing unit includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a removable medium such as a memory card, a read only memory (ROM), or the like. The storage device 1040 stores a program module that achieves each function of the arithmetic processing unit. The processor 1020 reads each program module onto the memory 1030 and executes the program module, and each function associated with the program module is achieved.

The input/output interface 1050 is an interface for connecting the arithmetic processing unit and various types of input/output equipment. For example, the arithmetic processing unit communicates with the first display 130, the second display 140, the third display 150, the customer input devices 172 and 174, and the code reader 180 via the input/output interface 1050.

The network interface 1060 is an interface for connecting the arithmetic processing unit to a network. The network is, for example, a local area network (LAN) and a wide area network (WAN). A method of connection to the network by the network interface 1060 may be wireless connection or wired connection.

As described above, according to the present example embodiment, the terminal apparatus 10 performs at least one of the product registration processing and the settlement processing. Then, when an orientation of one of the input device 120 and the first display 130 changes, an orientation of another also changes. Therefore, effort required of a user when the user adjusts an orientation of the display and the input device can be reduced.

While the example embodiments of the present invention have been described with reference to the drawings, the example embodiments are only exemplification of the present invention, and various configurations other than the above-described example embodiments can also be employed.

A part or the whole of the above-described example embodiment may also be described in supplementary notes below; which is not limited thereto.

1. A terminal apparatus being used when target processing being at least one of product registration processing and settlement processing is performed, the terminal apparatus including:
   a first support portion that rotatably supports, in a horizontal direction, an input device operated by a user;
   a first display facing the user;
   a second support portion that rotatably supports the first display in the horizontal direction; and
   an interlocking unit that interlocks the first support portion and the second support portion with each other, and rotates the input device and the first display in a same direction.
2. The terminal apparatus according to supplementary note 1 described above, further including:
   a housing; and
   a customer input device disposed on one surface of the housing and operated by a customer, wherein
   the second support portion includes
      a strut portion located on the housing, and
      a rotating portion that is provided on the strut portion and is rotatable in the horizontal direction,
   the first display is attached to the strut portion via the rotating portion, and
   the strut portion, a center of the housing, and the customer input device are arranged in this order when viewed from the user.
3. The terminal apparatus according to supplementary note 2 described above, wherein
   the rotating portion is also rotatable in an up-and-down direction.
4. The terminal apparatus according to any one of supplementary notes 1 to 3 described above, wherein
   the interlocking unit controls an orientation of the input device and the first display by using a detection result of a position of the user.
5. The terminal apparatus according to supplementary note 4 described above, wherein
   the interlocking unit has
      a first mode of controlling an orientation of the input device and the first display by using the detection result, and
      a second mode of changing, when an orientation of one of the input device and the first display changes due to an external force, an orientation of another of the input device and the first display.
6. The terminal apparatus according to any one of supplementary notes 1 to 5 described above, wherein
   the interlocking unit can release an interlock between the first support portion and the second support portion.
7. The terminal apparatus according to any one of supplementary notes 1 to 6 described above, wherein
   the user is one of a salesclerk and a customer,
   the terminal apparatus further includes a second display facing another of a salesclerk and a customer, and
   the second support portion rotatably supports the second display.
8. The terminal apparatus according to supplementary note 7 described above, further including:
   a third display facing the another; and
   a holding portion that integrally holds the second display and the third display, wherein
   the second support portion rotatably supports the holding portion.

REFERENCE SIGNS LIST

10 Terminal apparatus
110 Housing
120 Input device
130 First display
140 Second display
150 Third display
160 Capturing unit
172 Customer input device
174 Customer input device
180 Code reader
182 Strut
184 Reading unit
190 Capturing unit
200 Second support portion
210 Holding portion
220 Rotating portion
230 Holding portion
240 Rotating portion
250 Strut portion
300 First support portion
400 Interlocking portion

What is claimed is:

1. A terminal apparatus being used when target processing being at least one of product registration processing and settlement processing is performed, the terminal apparatus comprising:
   a first support portion that rotatably supports, in a horizontal direction, an input device operated by a user;
   a first display facing the user;
   a second support portion that rotatably supports the first display in the horizontal direction;
   an interlocking unit configured to interlock the first support portion and the second support portion with each other, and rotate the input device and the first display in a same direction;
   a housing; and
   a customer input device disposed on one surface of the housing and operated by a customer, wherein
   the second support portion includes
      a strut portion located on the housing, and
      a rotating portion that is provided on the strut portion and is rotatable in the horizontal direction,
   the first display is attached to the strut portion via the rotating portion, and
   the strut portion, a center of the housing, and the customer input device are arranged in this order when viewed from the user.
2. The terminal apparatus according to claim 1, wherein the rotating portion is also rotatable in an up-and-down direction.
3. The terminal apparatus according to claim 1, wherein the interlocking unit is configured to release an interlock between the first support portion and the second support portion.

4. A terminal apparatus being used when target processing being at least one of product registration processing and settlement processing is performed, the terminal apparatus comprising:
- a first support portion that rotatably supports, in a horizontal direction, an input device operated by a user;
- a first display facing the user;
- a second support portion that rotatably supports the first display in the horizontal direction; and
- an interlocking unit configured to interlock the first support portion and the second support portion with each other, and rotate the input device and the first display in a same direction, wherein the interlocking unit comprises:
- at least one memory configured to store instructions; and
- at least one processor configured to execute the instructions to perform operations comprising:
- controlling an orientation of the input device and the first display based on a position of the user.

5. The terminal apparatus according to claim 4, wherein the interlocking unit has
- a first mode of controlling an orientation of the input device and the first display based on the position of the user, and
- a second mode of changing, when an orientation of one of the input device and the first display changes due to an external force, an orientation of another of the input device and the first display.

6. A terminal apparatus being used when target processing being at least one of product registration processing and settlement processing is performed, the terminal apparatus comprising:
- a first support portion that rotatably supports, in a horizontal direction, an input device operated by a user;
- a first display facing the user;
- a second support portion that rotatably supports the first display in the horizontal direction; and
- an interlocking unit configured to interlock the first support portion and the second support portion with each other, and rotate the input device and the first display in a same direction, wherein
- the user is one of a salesclerk and a customer,
- the terminal apparatus further comprises a second display facing another of the salesclerk and the customer, and
- the second support portion rotatably supports the second display.

7. The terminal apparatus according to claim 6, further comprising:
- a third display facing the another; and
- a holding portion that integrally holds the second display and the third display, wherein
- the second support portion rotatably supports the holding portion.

* * * * *